United States Patent
Fan et al.

(10) Patent No.: US 7,060,420 B2
(45) Date of Patent: Jun. 13, 2006

(54) FABRICATION METHOD FOR LIQUID CRYSTAL DISPLAY

(75) Inventors: Yang-Yi Fan, Taichung (TW);
Hsin-Chun Chiang, Hsinchu (TW);
Ing Jer Lin, Hsinchu (TW); Yi-Chun Wong, Tainan (TW); Tsan-Yu Ho, Tainan (TW); Lung-Pin Hsin, Taichung (TW); Kang-Hung Liu, Hsinchu (TW); Chung-Wen Wu, Taipei (TW); Yi-An Sha, Taipei (TW)

(73) Assignee: Chi Mei Optoelectronics Corp., Tainan (TW)

( * ) Notice: Subject to any disclaimer, the term of this patent is extended or adjusted under 35 U.S.C. 154(b) by 0 days.

(21) Appl. No.: 10/944,774

(22) Filed: Sep. 21, 2004

(65) Prior Publication Data
US 2005/0078249 A1  Apr. 14, 2005

(30) Foreign Application Priority Data
Oct. 9, 2003  (TW) ............................. 92128058 A

(51) Int. Cl.
*G02F 1/1337* (2006.01)
(52) U.S. Cl. ...................... 430/321; 349/124; 349/126
(58) Field of Classification Search ..................... None
See application file for complete search history.

(56) References Cited

U.S. PATENT DOCUMENTS

| 5,626,995 A * | 5/1997 | Teruya et al. ................. 430/20 |
| 5,796,458 A * | 8/1998 | Koike et al. ................. 349/126 |
| 2005/0046771 A1* | 3/2005 | Lee et al. .................. 349/126 |

FOREIGN PATENT DOCUMENTS

| JP | 8-122792 A | 5/1996 |
| JP | 10-142608 A | 5/1998 |

* cited by examiner

*Primary Examiner*—John A. McPherson
(74) *Attorney, Agent, or Firm*—Birch, Stewart, Kolasch & Birch, LLP

(57) ABSTRACT

A fabrication method for a liquid crystal display. A pair of substrates is provided. An alignment layer is formed on the respective substrates. An energy beam is irradiated on a predetermined area of at least one of the alignment layers. The alignment layer is rubbed to form a first pretilt-angle area in the predetermined area exposed to the energy beam, and a second pretilt-angle area not exposed to the energy beam. The pair of substrates are bonded with a preset gap therebetween, and a liquid crystal layer is inserted between the substrates. The liquid crystals corresponding to the first pretilt angle area have a first pretilt angle of $\theta_1$, while those corresponding to the second pretilt angle area have a second pretilt angle of $\theta_2$.

22 Claims, 3 Drawing Sheets

FABRICATION METHOD FOR LIQUID CRYSTAL DISPLAY

This Nonprovisional application claims priority under 35 U.S.C. § 119(a) on Patent Application No(s). 092128058 filed in Taiwan, Republic of China on Oct. 9, 2003, the entire contents of which are hereby incorporated by reference.

BACKGROUND OF THE INVENTION

1. Field of the Invention

The present invention relates to a fabrication method for a liquid crystal display, and more particularly to a fabrication method for a liquid crystal display having at least two pretilt angles.

2. Description of the Related Art

Liquid crystal displays (LCD) are commonly used for flat panel display. Owing to dielectric anisotropy and conductive anisotropy of liquid crystal molecules, molecular orientation of liquid crystals can be shifted under an external electronic field, such that various optical effects are produced.

An LCD panel is generally made up of two substrates, with a certain gap preserved therebetween, and a liquid crystal layer filled within the gap. Respective electrodes are formed on the two substrates, respectively, to control the orientation and orientational shift of liquid crystal molecules.

A TFT (thin film transistor) LCD panel is generally made up of a TFT array substrate and a color filter substrate, and alignment layers are usually disposed on countering sides of the respective substrate to control the alignment of a center-filled liquid crystal layer.

Conventional preparation methods of alignment layers are, for example, evaporation, rubbing and photo-alignment. For large-size panel fabrication, rubbing is still mainly used owing to its mature technology, continuous productivity and low cost.

Rubbing is performed as follows. The countering sides of the upper and lower substrates of an LCD panel are first coated with polymeric solution to form alignment layers. The alignment layers are then rubbed by a covered roller, with a definite orientation created by the directional pile of the covering cloth. By the orientation of the alignment layers, the liquid crystals on the alignment layers are aligned because of molecular actions therebetween. By controlling the rubbing direction of the roller, the liquid crystals are aligned of a certain pretilt angle, benefiting various driving modes of the LCD.

To create multiple domains (of pretilt angle) on the alignment layers, photo-alignment is generally applied, for example, as in Japan Publication Patent No. 10-142608 presented by LG Electron Inc. However, photo-alignment requires polarized light in oblique incidence, resulting in low orientation and anchoring energy. IBM has provided a fabrication method regarding a first-rubbing-latter-exposing process (Japan Publication No. 08-122792), wherein a polarized beam must be applied, and only planar alignment achievable. Even though the pretilt angle may be reduced by breaking polymer side chains in the exposure step, owing to the currently limited polarization provided by a polarizing machine (100% polarized light is hard to obtain), local exposure to the light adversely affects the orientation after rubbing.

SUMMARY OF THE INVENTION

Accordingly, an object of the present invention is to provide a simple and low-cost fabrication method for an LCD with alignment layers of at least two pretilt-angle areas.

Another object of the invention is to provide a fabrication met-hod for an LCD, wherein an unpolarized electromagnetic wave beam may be applied, in normal incidence, combined with rubbing to prepare alignment layers with various pretilt-angle areas for aligning liquid crystals at various pretilt angles. Furthermore, polarized electromagnetic wave beam and oblique incidence are also applicable in the present invention.

Therefore, the invention provides a fabrication method for a liquid crystal display, which comprises providing a pair of substrates, forming alignment layers on the respective substrates, irradiating a predetermined area of at least one alignment layer with an energy beam, rubbing the alignment layer such that a first pretilt-angle area is formed in the predetermined area exposed to the energy beam, a second pretilt-angle area is formed in the area not exposed to the energy beam, bonding the pair of substrates with a preset gap therebetween, and inserting a liquid crystal layer between the substrates, wherein the liquid crystals corresponding to the first pretilt-angle area have a first pretilt angle of $\theta_1$, and hose corresponding to the second pretilt-angle area have second pretilt angle of $\theta_2$.

The invention further provides another fabrication method for a liquid crystal display, which comprises providing a pair of substrates, forming alignment layers on the respective substrates, normally irradiating a predetermined area of at least one alignment layer with an unpolarized electromagnetic wave beam, rubbing the alignment layer such that a first pretilt-angle area is formed in the predetermined area exposed to the unpolarized electromagnetic wave beam, a second pretilt-angle area is formed in the area not exposed to the unpolarized electromagnetic wave beam, bonding the pair of substrates with a preset gap therebetween, and inserting a liquid crystal layer between the substrates, wherein the liquid crystals corresponding to the first pretilt-angle area have a first pretilt angle of $\theta_1$, and those corresponding to the second pretilt-angle area have a second pretilt angle of $\theta_2$.

According to the invention, rubbing is performed after energy-beam exposure. The predetermined area of the alignment layer is exposed to the energy beam, breaking the polymer side chains to thereby reduce the pre-tilt angle of liquid crystals corresponding to the area, and the entire alignment layer is then rubbed with strong anchoring energy, forming a first pretilt angle area in the predetermined area exposed to the energy beam, and a second pretilt angle area in the rest area not exposed to the energy beam. According to the invention, energy-beam exposure is performed before rubbing, such that a linearly polarized energy beam is not required, and undesired effects of exposure on orientation are avoided. The "rubbing after exposure" method ensures overall orientation of alignment.

Furthermore, in addition to enhancing the orientation and anchoring energy, by utilizing an unpolarized energy beam and/or normal incidence, the equipment required is simplified, thereby reducing costs.

Moreover, by breaking the polymer side chains with an energy beam, the original vertically-aligned alignment layer may be transferred to be planar alignment, i.e., forming a planar alignment area in the exposed area, and a vertically aligned area in the unexposed area. Thus, the difference between the first pretilt angle and the second pretilt angle may be varied in a broadening range, benefiting adjustment according to desired specifications.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

In the embodiment, a thin film transistor LCD is used as an example to explain the inventive fabrication method. According to the invention, the energy beam exposed on the alignment layer breaks the polymer side chains, and thus may be applied in any form, such as unpolarized electromagnetic wave beam, polarized electromagnetic wave beam, electron beam, laser beam, ion beam or plasma beam. The energy beam may be normally or obliquely incident on the alignment layers.

First, a pair of substrates 10, 20 (for an LCD panel) is provided. The substrates are, for example, glass or polymeric substrates. Thin film transistors and color filters are manufactured on respective substrates. Next, alignment layers 11, 21 including polyimide, are formed respectively on the substrates 10, 20.

According to the method, in the case of preparing a vertically aligned alignment layer, the first pretilt angle $\theta_1$ is between 0° and the second pretilt angle $\theta_2$, in the case of preparing a planar aligned alignment layer, the second pretilt angle $\theta_2$ is between the first pretilt angle $\theta_1$ and 90°.

In the following, the substrate 10 is used in explaining the detailed fabrication method.

Figure 1:
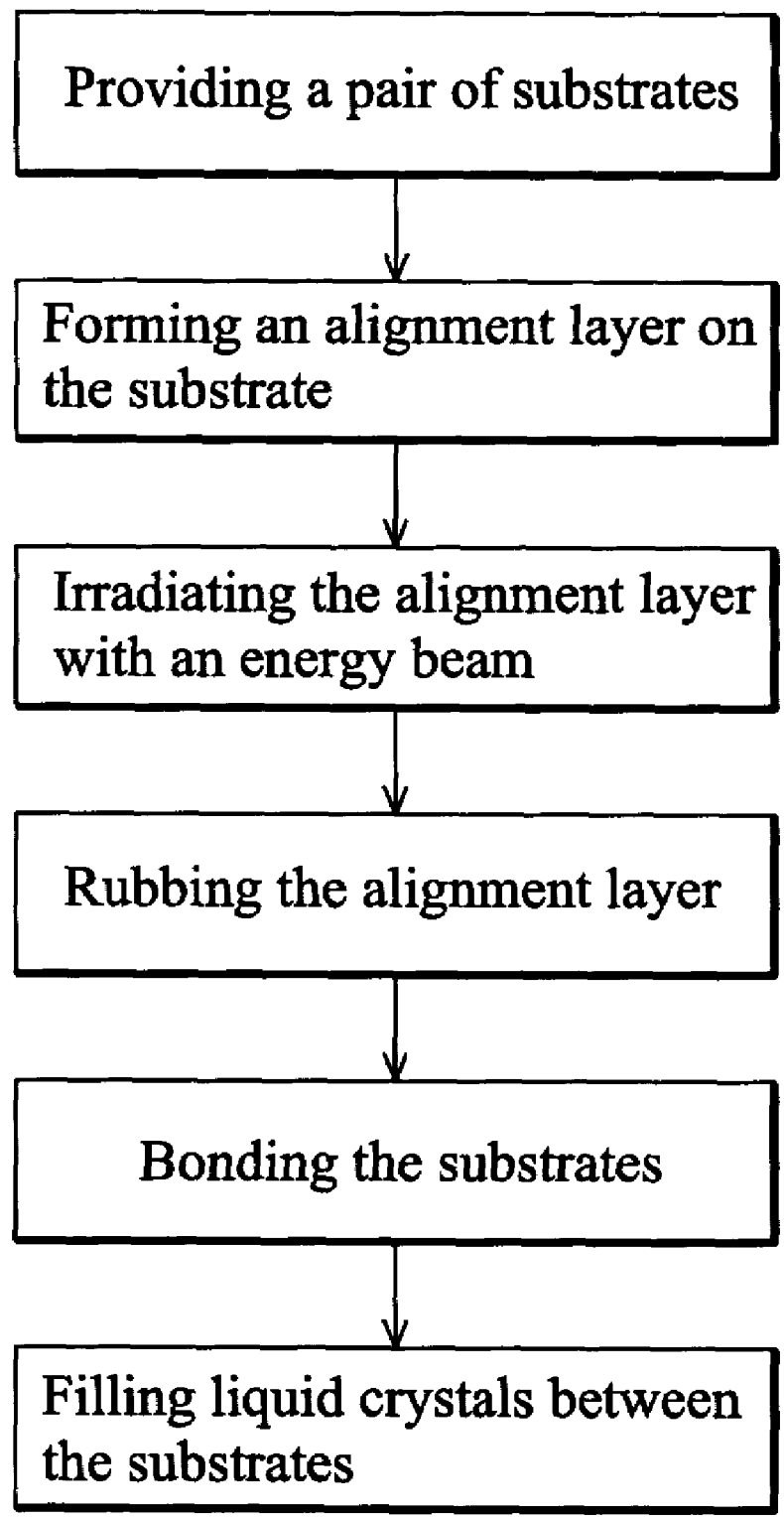
FIG. 1 is a flowchart of the inventive method.
Figure 2A:
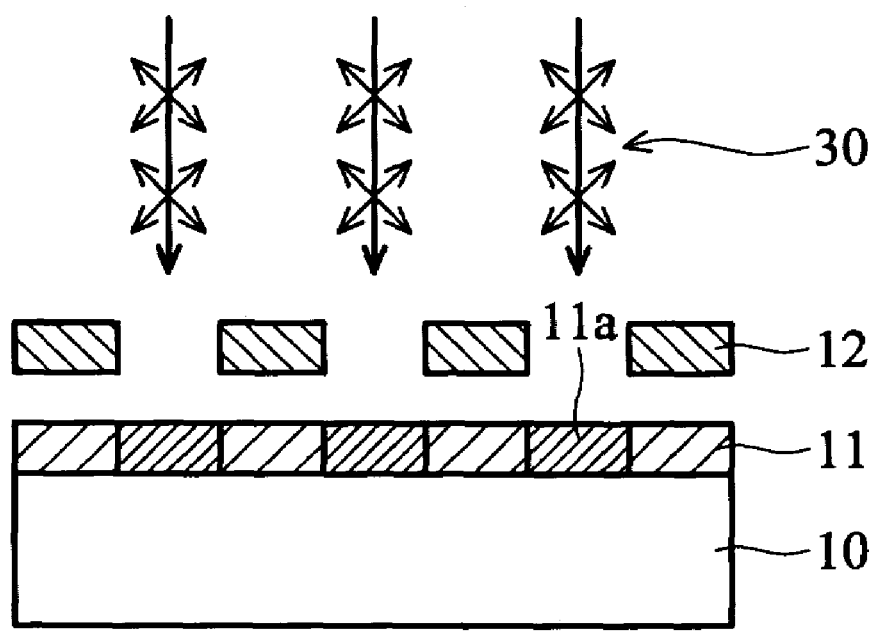
FIG. 2a–2b illustrates the fabrication of the alignment layer.

In FIG. 2a, a substrate 10 with TFT array (not shown) is coated with an alignment layer 11 of, for example, polyimide. Owing to a high side-chain density of the polyimide, the alignment layer 11 is a vertically aligned alignment layer. After hard baking, the alignment layer 11 is normally exposed to an unpolarized UV beam 30 via a mask 12, breaking the PI side-chains in the area 11a exposed to the unpolarized UV beam 30, and reducing the pretilt angle $\theta_1$ of the area.

Figure 2B:
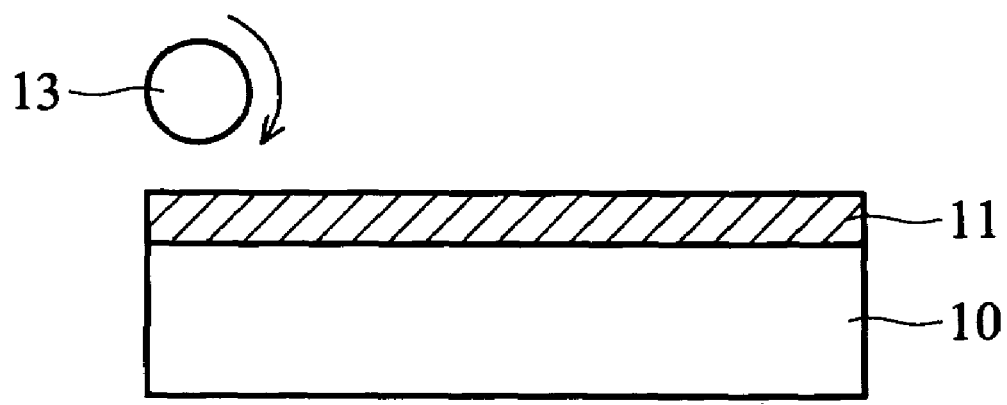

In FIG. 2b, a roller 13 covered with a cloth is applied to rub the alignment layer 11, wherein areas of various pretilt angles $\theta_1$ and $\theta_2$ are provided. The area 11a exposed to the unpolarized UV light beam 30 forms a first pretilt angle area, while the remainder of the alignment layer 11 not exposed to the unpolarized UV light beam 30 forms a second pretilt angle area. The first pretilt angle $\theta_1$ of the liquid crystals corresponding to the first pretilt angle area is between 0° and the second pretilt angle $\theta_2$, and the second pretilt angle $\theta_2$ of the liquid crystals corresponding to the second pretilt angle area is between the first pretilt angle $\theta_1$ and 90°. By exposing the unpolarized UV light beam 30 at a power of 500 W for 20–200 mins, the first pretilt angle $\theta_1$ is reduced to 0.5°, approaching the pretilt angle of a planar aligned alignment layer.

Contrary to the vertically aligned alignment layer 11 on the TFT array substrate 10, the alignment layer 21 on the color filter substrate 20 is made of planar-aligning PI.

Next, as in a normal fabricating process of LCD panel, the color filter substrate 20 and TFT array substrate 10 are aligned and combined.

Figure 3:
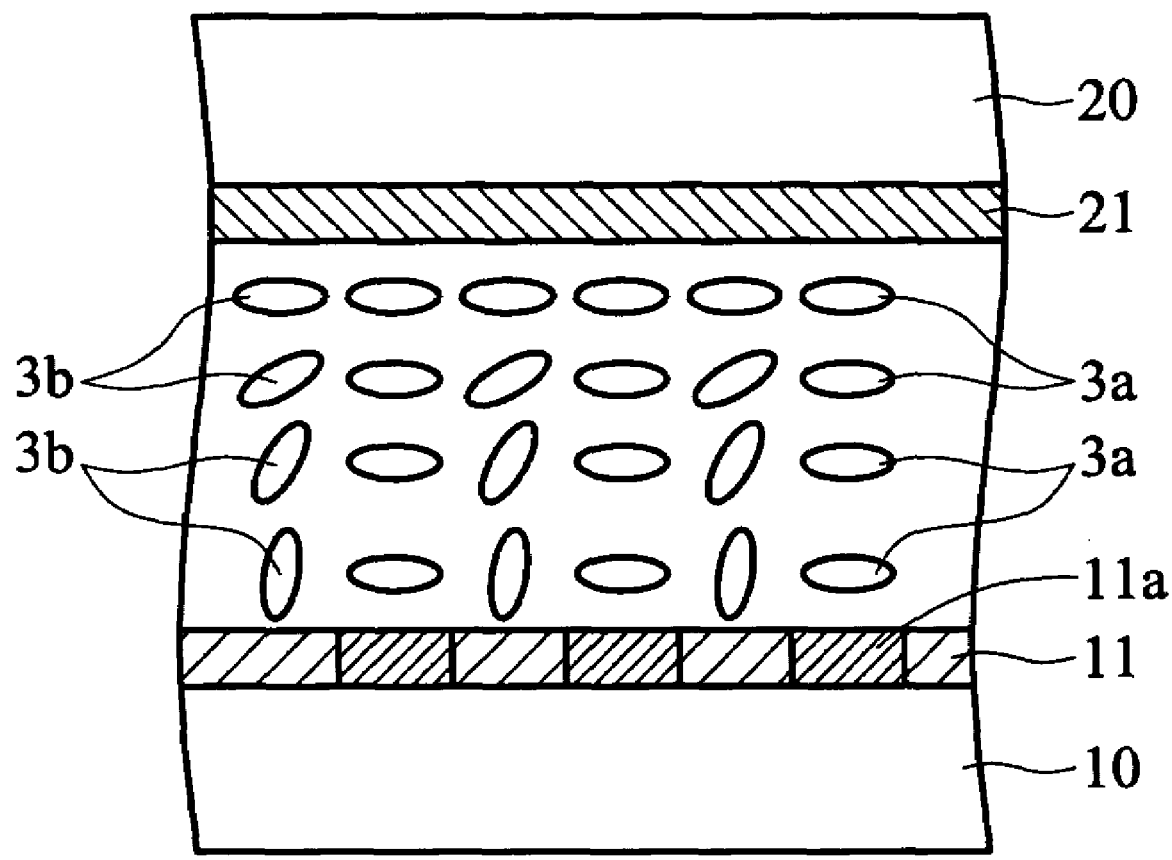
FIG. 3 is a cross-section showing the LCD of the invention.

Afterward, liquid crystals 3 are filled into the LCD panel, following the sealing of the panel, as shown in FIG. 3. Alternatively, liquid crystals 3 are formed on at least one of the substrates before the substrates are bonded.

According to the invention, rubbing is performed after energy-beam exposure. The area 11a of the alignment layer 11 is exposed to the unpolarized UV light beam 30, breaking the PI side chains to thereby reduce the pretilt angle $\theta_1$ of liquid crystals corresponding to the area, and the entire alignment layer 11 is then rubbed with strong anchoring energy, forming a first pretilt angle area in the area 11a, and a second pretilt angle area in the remainder not exposed to the unpolarized UV light beam 30. According to the invention, unpolarized UV beam 30 exposure is performed before rubbing, such that a linearly polarized energy beam is no longer required, and undesired effects of exposure on orientation are avoided. The "rubbing after exposure" method ensures overall orientation of alignment.

Thus, according to the invention, an unpolarized electromagnetic wave beam, in normal incidence, combined with rubbing, prepares alignment layers with various pretilt-angle areas for aligning liquid crystals in various pretilt angles.

Furthermore, the invention exhibits advantages such as stable materials (commercial materials for alignment layers are applicable), strong anchoring energy (rubbing of a strong anchoring energy is applied in company with photo-alignment of a weak anchoring energy), simple process (only one step of exposure is required), easy alignment (suitable for normal incidence), and applications for a normal exposure machine (suitable for unpolarized energy beam). Thus, by reducing manufacture costs and simplifying processes, the inventive fabrication method for LCD is suitable for mass production.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A fabrication method for a liquid crystal display, comprising:
   providing a pair of substrates;
   forming vertically aligned alignment layers on the respective substrates;

irradiating a predetermined area of at least one alignment layer with an energy beam;

rubbing the alignment layer such that a first pretilt-angle area is formed in the predetermined area exposed to the energy beam, and a second pretilt-angle area is formed in the area not exposed to the energy beam, wherein the alignment layer is rubbed along the elongation direction of the interface between the exposed area and the non-exposed area thereof; and bonding the pair of substrates with a liquid crystal layer therebetween, wherein the liquid crystals corresponding to the first pretilt-angle area have a first pretilt angle of $\theta_1$ of approximately 0° and those corresponding to the second pretilt-angle area have a second pretilt angle of $\theta_2$ of approximately 90°.

2. The fabrication method as claimed in claim 1, wherein the energy beam is an unpolarized electromagnetic wave beam.

3. The fabrication method as claimed in claim 1, wherein the energy beam is a polarized electromagnetic wave beam.

4. The fabrication method as claimed in claim 1, wherein the energy beam is an electron beam.

5. The fabrication method as claimed in claim 1, wherein the energy beam is a laser beam.

6. The fabrication method as claimed in claim 1, wherein the energy beam is a plasma beam.

7. The fabrication method as claimed in claim 1, wherein the energy beam is an ion beam.

8. The fabrication method as claimed in claim 1, wherein the energy beam is normally incident to the predetermined area.

9. The fabrication method as claimed in claim 1, wherein the energy beam is obliquely incident to the predetermined area.

10. The fabrication method as claimed in claim 1, wherein the substrates are glass or polymeric substrates.

11. The fabrication method as claimed in claim 1, wherein the substrates are a thin-film transistor substrate and a color filter substrate, respectively.

12. The fabrication method as claimed in claim 1, wherein the alignment layer comprises polyimide (PI).

13. The fabrication method as claimed in claim 1, wherein the liquid crystal layer is injected between the substrates after the substrates are bonded.

14. The fabrication method as claimed in claim 1, wherein the liquid crystal layer is formed on at least one of the substrates before the substrates are bonded.

15. The fabrication method as claimed in claim 1, wherein both alignment layers on the substrates are irradiated and rubbed to form areas of various pretilt angles.

16. A fabrication method for a liquid crystal display, comprising:

providing a pair of substrates;

forming vertically aligned alignment layers on the respective substrates;

normally irradiating a predetermined area of at least one alignment layer with an unpolarized electromagnetic wave beam;

rubbing the alignment layer such that a first pretilt-angle area is formed in the predetermined area exposed to the unpolarized electromagnetic wave beam, and a second pretilt-angle area is formed in the area not exposed to the unpolarized electromagnetic wave beam, wherein the alignment layer is rubbed along the elongation direction of the interface between the exposed area and the non-exposed area thereof; and bonding the pair of substrates with a liquid crystal layer therebetween, wherein the liquid crystals corresponding to the first pretilt-angle area have a first pretilt angle of $\theta_1$ of approximately 0° and those corresponding to the second pretilt-angle area have a second pretilt angle of $\theta_2$ of approximately 90°.

17. The fabrication method as claimed in claim 16, wherein the substrates are glass or polymeric substrates.

18. The fabrication method as claimed in claim 16, wherein the substrates are a thin-film transistor substrate and a color filter substrate, respectively.

19. The fabrication method as claimed in claim 16, wherein the alignment layer comprises polyimide (PI).

20. The fabrication method as claimed in claim 16, wherein the liquid crystal layer is injected between the substrates after the substrates are bonded.

21. The fabrication method as claimed in claim 16, wherein the liquid crystal layer is formed on at least one of the substrates before the substrates are bonded.

22. The fabrication method as claimed in claim 16, wherein both alignment layers on the substrates are irradiated and rubbed to form areas of various pretilt angles.

* * * * *